United States Patent Office 2,761,241
Patented Sept. 4, 1956

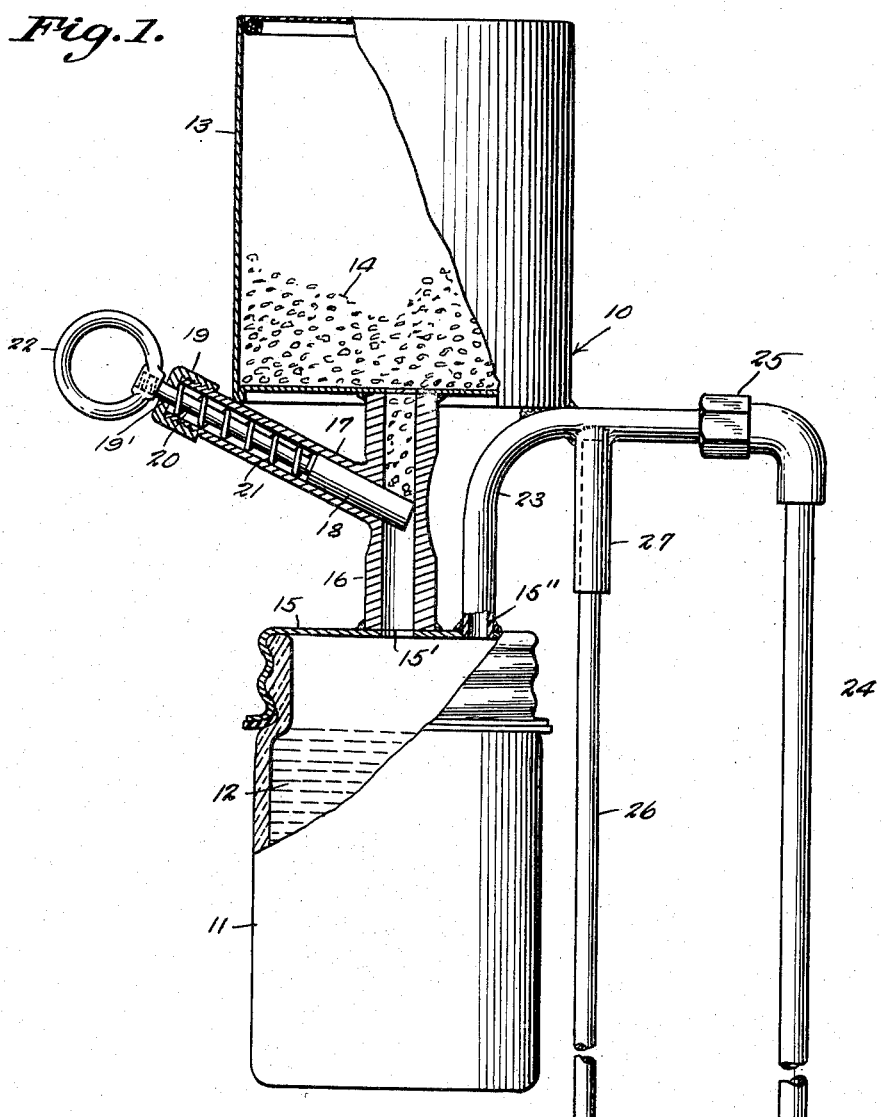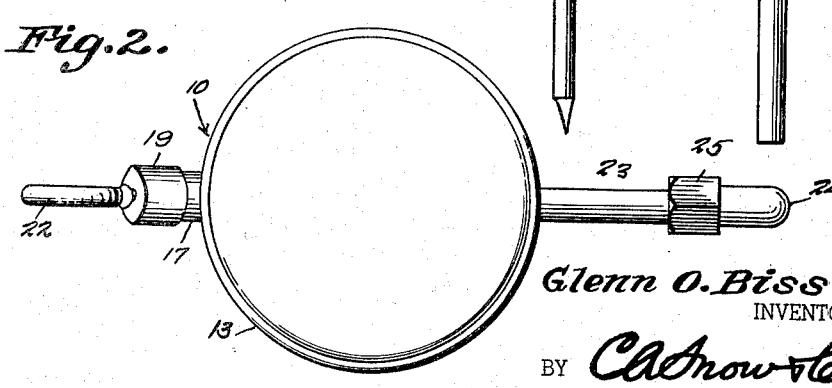

2,761,241

ANIMAL EXTERMINATING DEVICE

Glenn O. Bissey, Cisne, Ill.

Application October 27, 1953, Serial No. 388,531

1 Claim. (Cl. 43—129)

This invention relates to a gas generator and more particularly to a gas generator to be used as an animal exterminating device.

It is a principal object of this invention to provide an animal exterminating device designed to exterminate groundhogs, rats, gophers and other ground engaging burrowing animals.

It is another object of this invention to provide a gas generating device of this kind which is simple in construction and powerful and fast in operation for easy movement from one place to another for support above the earth and connectable with openings in the ground for asphyxiating an animal in its burrow or habitat in the earth.

A further object of this invention is to provide an animal asphyxiating device of the kind which is light in weight of relatively small size and operable with easily obtainable material having a simple spring pressed valve for controlling the generation of acetylene gas with a swivelled connecting pipe between the generator and the selected burrow in the ground to give greater flexibility and convenience for the use of the gas generator.

In the drawings:

Fig. 1 is a side elevation, partly broken away and partly in section, of a gas generator constructed according to an embodiment of my invention.

Fig. 2 is a top plan view thereof.

Referring to the drawings, the numeral 10 designates generally an animal exterminating device, constructed according to an embodiment of my invention which is provided with a receptacle 11 for containing a liquid, such as water, and the liquid containing receptacle 11 is light in weight and may be carried about from one place to another for engaging a portion of the exterminating device 10 within the hole or burrow of the animal sought to be killed.

A second receptacle 13 is secured to the lower receptacle 11 immediate thereabove and carbide 14 in granular form is placed within the upper container 13 before being admitted to the water 12 within the receptacle 11. A cover 15 is threadedly secured on the upper open end of the lower receptacle 11 much in the manner of a cover for a Bell glass jar and the cover 15 is provided with a pair of spaced apart openings therethrough 15' and 15" for connection to the granular carbide containing receptacle 13 and a discharge pipe 23.

A pipe 16 is secured to the cover 15 and extends upwardly from the opening 15' for securing to the lower surface of the upper receptacle 13 and down which the granular carbide is free to slide by gravity. The upper end of the pipe 16 is secured to the lower surface of the upper container 13 and is in communication therewith through an opening in the bottom of the receptacle.

A valve means is provided intermediate the pipe 16 for stopping the flow of the granular carbide downwardly from the upper container 13 to the lower liquid container 14. The valve means includes an upwardly and outwardly extending cylinder 17 which is connected at the lower end thereof to the pipe 16 intermediate the length of the pipe 16 between the receptacles 11 and 13.

A piston or plunger 18 is slidable within the cylinder 17 and partially into the pipe 16 for restricting the flow of the granular carbide therethrough. A cap 19 is threadedly engaged on the upper open end of the cylinder 17 and is provided with a central opening 19' through which an actuating piston rod 20 is slidably engaged and one end of the piston or plunger rod 20 is fixed to one end of the piston or plunger 18 while the other end of the piston rod extends from the upper outer end of the cylinder through the opening 19' in the cap 19. A coil spring 21 about the piston or plunger rod 20 engages one end of the piston 18 and the other end of the coil spring 21 engages the inner surface of the cap 19 for constantly urging the plunger 18 into the pipe 16 for restricting the flow of the granular material. A handle 22 is secured to the other end of the piston rod 20 outwardly of the cylinder 17 by which a person may grasp the handle 22 and upon drawing the handle outwardly of the cylinder the piston will be drawn into the other end of the cylinder thereby freeing the pipe so that the granular material may slide downwardly through the pipe from the upper receptacle 13 into the lower receptacle 11.

The lower end of the pipe 16 is in communication with the lower receptacle 11 through the opening 15' and when the granular carbide passes from the upper receptacle 15 downwardly through the pipe 16 into the water 12 in the lower receptacle 11 a gas is generated within the lower receptacle 11 above the level of the water and the gas thus formed is discharged through a discharge pipe 23 having one end thereof in communication with the other opening 15".

The discharge pipe 23 being L-shaped is bent, intermediate the length thereof, and the upper receptacle 13 is secured to the discharge pipe 23 at the bend in the pipe where the pipe 23 bends from a vertically extending portion from the lower receptacle 11 to a horizontally extending portion.

The entire animal exterminating device 10 is adapted to be supported above the surface of the ground by a support which is connected to the discharge pipe 23 and the support includes an elongated rod 26 which is sharp at the lower end thereof for penetrating the earth and is secured at the other end thereof in a depending sleeve 27 which is fixed to the horizontally extending portion of the discharge pipe 23.

When the granulated carbide is permitted to drop through the pipe 16 into the water 12 a gas is formed which builds up pressure in the container 11 and passes from the lower receptacle 11 through the discharge pipe 23 to which an extension 24 is swivelly connected at 25 to the outer free end of the discharge pipe 23 for extension into a selected hole in the ground as a burrow formed by an animal sought to be killed in the field.

In use, the lower receptacle 11 is initially filled with water to a desired level and the upper receptacle 13 is filled with a selected amount of granular carbide. The supporting rod 26 is penetrated into the ground for supporting the animal exterminating device 10 in a selected place on the ground and the discharge pipe extension 24 is placed with its free end within the opening of a burrow.

While the specific details of one embodiment of this invention have been here shown and described, the invention is not confined thereto as changes and alterations may be made without departing from the spirit and scope thereof as defined in the appended claim.

I claim:

A gas generating means for use in exterminating burrowing animals comprising spaced upper and lower containers, a tube connecting said containers, a cylindrical valve housing extending from said tube, said tube having an opening communicating with said housing at the inner end thereof, a plunger slidable in said housing and adapted to be moved through said opening in said tube for restricting communication between said containers, a spring in said housing constantly urging said plunger inwardly to cutoff position, a stem extending axially from said plunger through the outer end of said housing, a handle on the outer end of said stem, a gas conducting pipe communicating with said lower container and fixed to said upper container, and a supporting rod fixed to said gas conducting pipe and adapted to pierce the ground for supporting the device in operative position with said gas conducting pipe adapted to project into a burrow.

References Cited in the file of this patent

UNITED STATES PATENTS

| | | |
|---|---|---|
| 688,725 | Flatau | Dec. 10, 1901 |
| 1,309,193 | Garrison | July 8, 1919 |
| 1,401,292 | Van Meter | Dec. 27, 1921 |
| 1,612,283 | Hackney | Dec. 28, 1926 |
| 1,961,168 | Riebel, Jr., et al. | June 5, 1934 |
| 2,305,203 | Smith | Dec. 15, 1942 |
| 2,480,167 | Thomas | Aug. 30, 1949 |

FOREIGN PATENTS

| | | |
|---|---|---|
| 22,688 | Australia | May 18, 1936 |
| 84,862 | Switzerland | Apr. 16, 1920 |
| 669,395 | France | Nov. 15, 1929 |